Sept. 14, 1937.   A. SCHMIDT, JR   2,093,342
ELECTRIC CONTROL AND INDICATING SYSTEM
Filed Dec. 12, 1935
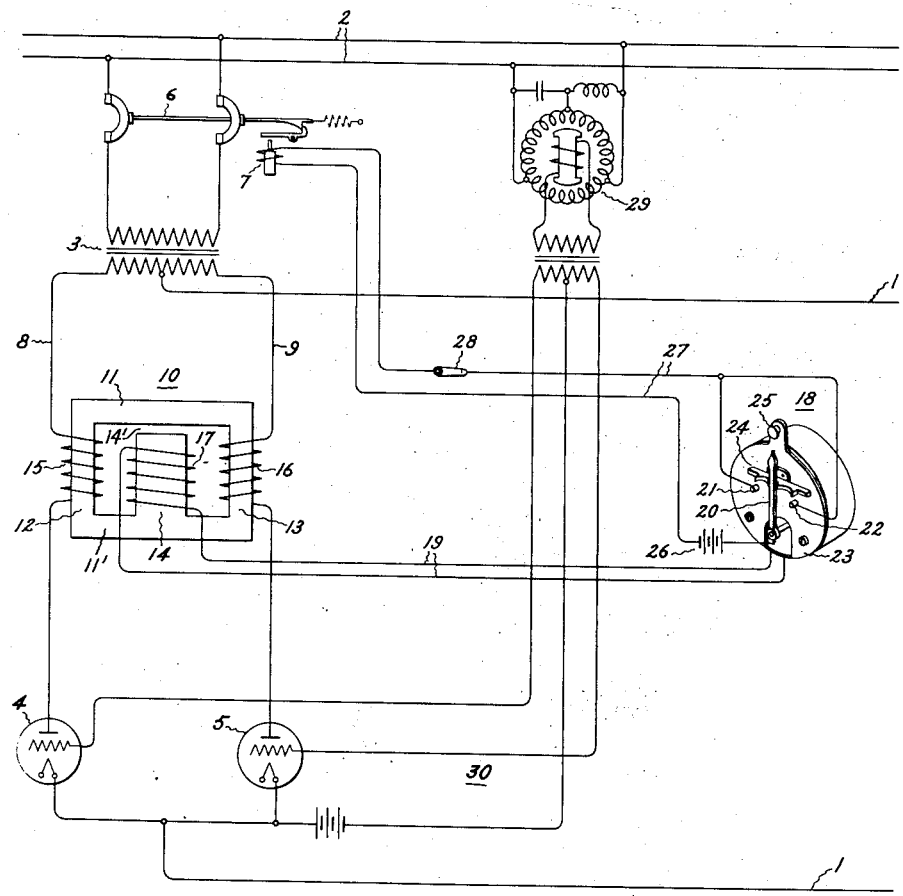
Inventor:
August Schmidt, Jr,
by Harry E. Dunham
His Attorney.

Patented Sept. 14, 1937

2,093,342

UNITED STATES PATENT OFFICE 2,093,342

ELECTRIC CONTROL AND INDICATING SYSTEM

August Schmidt, Jr., Schenectady, N. Y., assignor to General Electric Company, a corporation of New York Application December 12, 1935, Serial No. 54,081

11 Claims. (Cl. 175—363)

My invention relates to electric circuits and more particularly to control and indicating systems for electric valve circuits.

In electrical systems in which a number of circuits are supplying energy to a load circuit, it is frequently desirable to provide means for rapidly and precisely controlling the system when there is a reversal of energy flow in the system. Particularly is this true in electric valve circuits where a plurality of electric valves are energized by means of individual circuits. For example, electric valve converting systems are frequently arranged having a number of circuits which supply current to rectifying devices. A reversal of current in one of these circuits indicates that the associated rectifying device is operating in an abnormal manner. Under these conditions it is necessary to control the system and it is also desirable to provide means for indicating which rectifying device has been the cause of the irregular operation. Furthermore, such indicating and control systems should be of simple and inexpensive construction and should be readily adaptable to electric valve circuits generally.

An object of my invention is to provide an improved control circuit for electric circuits.

Another object of my invention is to provide an improved control and indicating system for electric circuits which will respond to a reversal of energy transfer.

A further object of my invention is to provide an improved control and indicating system for electric valve circuits which will operate in response to current reversal.

A still further object of my invention is to provide a control and indicating arrangement for an electric system comprising a plurality of conductors for transmitting current in a predetermined manner which will operate to control the electric system or to afford an indication when the currents in the conductors depart from the predetermined mode or manner of variation.

In accordance with the illustrated embodiment of my invention, an inductive device or reactor is associated with each of the conductors or circuits of an electric translating system. The inductive device is provided with energizing windings, each of which is energized in response to an electrical quantity, such as current, which normally varies in accordance with a predetermined mode of variation. In the particular system described hereinafter, each of the energizing windings is energized in response to the current conducted by the individual rectifying devices employed in the system. Under normal operating conditions, that is when the various rectifying devices are conducting current in accordance with the predetermined manner or mode of variation, the inductive device is unresponsive to effect any control or indication. However, under abnormal operating conditions, such as a reversal of current in one of the circuits, the inductive device will respond to control the system or to actuate an indicating means. More specifically, the inductive device is provided with a magnetic core structure in which magnetic flux is established by windings energized in response to an electrical quantity of the circuits to be controlled. The core structure is provided with a relatively high reluctance magnetic circuit through which, under normal conditions, a comparatively small amount of magnetic flux passes. Upon reversal of the electrical quantity to be regulated in one of the various electric circuits, a redistribution of the magnetic flux within the core member takes place, resulting in a transfer of the flux through the relatively high reluctance magnetic circuit. This change of flux is utilized to provide a selective indication in response to reversal of an electrical quantity in any one of the electric circuits.

For a better understanding of my invention together with other and further objects thereof reference may be had to the following description taken in connection with the accompanying drawing, and its scope will be pointed out in the appended claims.

Referring now to the single figure of the drawing, which diagrammatically represents an embodiment of my invention as applied to a single phase full-wave rectifying arrangement, a unidirectional current is supplied to a direct current load circuit 1 from an alternating current circuit 2, through a transformer 3 and electric valves 4 and 5. The electric valves 4 and 5 may be any of the several types known in the art, but my invention is directed more particularly to electric circuits utilizing valves of the vapor electric type. A circuit interrupter 6 having an electromagnetic actuating element 7 is connected in series with transformer 3 to control the energization of the rectifying arrangement. Connected in series with the transformer 3 by means of conductors 8 and 9 is an inductive device 10 having core members 11 and 11' and having magnetic legs 12, 13 and 14. The reluctance of the magnetic circuit through leg 14 is relatively high compared with the reluctances of the magnetic circuit consisting of legs 12 and 13 and core members 11 and 11'. An air gap 14' may be utilized to obtain this effect or a non-magnetic material or a restricted section may be used. The inductive device 10 is also provided with windings 15 and 16 which may be arranged, as is diagrammatically shown in the drawing, to be energized in response to the current transfer occasioned by electric valves 4 and 5, respectively. The windings 15 and 16 are associated with the legs 12 and 13, respectively, of the inductive device 10 to control the magnetization of the associated magnetic circuit. A winding 17 is associated with the leg 14 of the inductive device 10 to provide an electrical variation in response to a predetermined electrical condition of the inductive device 10, such as a predetermined magnetic condition or in response to a predetermined change in the magnetization of the core member 11.

To afford a visual indication of the effect produced by the inductive device 10 and its associated elements, a voltage responsive indicating device or instrument 18 may be used. The device 18 is energized from the winding 17 of the inductive device 10 and is connected to the winding 17 by means of conductors 19. If it is found desirable to interrupt the feeder circuit upon the occurrence of a reversal of current flow, the circuit interrupter 6 is arranged to be controlled from the indicating instrument or voltage responsive device 18 which is provided with a movable indicator or contact 20 and stationary contacts 21 and 22 arranged to control the energization of the electromagnetic actuating element 7 of circuit interrupter 6. The voltage responsive device 18 is provided with means, such as a plate 23 having a retaining member 24, for maintaining the indicator 20 in position after it has been moved to the right or to the left. The plate 23 is normally biased to cause the retaining member 24 to engage the movable contact 20. To release the movable contact 20 after it has been moved to one of these positions, it may be reclosed by moving the plate 23 by suitable means such as a button 25. A deflection of the movable contact member 20 in one direction may be employed arbitrarily to indicate irregular or abnormal operation of the electric valve 4 and a deflection in the opposite direction may be used to designate irregular operation of the electric valve 5. The actuating element 7 of the circuit interrupter 6 is energized from a source 26 through the voltage responsive element 18 and conductors 27. A switch 28 is connected in series with the actuating element 7 of the circuit interrupter 6 to open the circuit thereto in the event it is not necessary to control the rectifying arrangement in response to reverse current conditions within the rectifying circuit. It will be apparent that the control system as diagrammatically illustrated in the drawing not only controls the rectifying arrangement in response to reverse current conditions, but also affords an indication as to which of the electric valves has been subject to a reverse current or arc-back condition.

A conventional phase shifting arrangement, such as the rotary phase shifter 29, may be used to control the energization of the electric valves 4 and 5, through the excitation circuits 30.

Although my invention has been shown and described as applied to a system in which the conductors to be controlled are transmitting unidirectional current, it should be understood that my invention may also be applied to a system in which the conductors transmit current in accordance with the same or different predetermined modes of variation, such as alternating current systems employing a plurality of circuits.

The operation of the embodiment of my invention diagrammatically illustrated in the drawing may be best explained by first considering the electric valve circuit when it is operating normally. In the manner well understood by those skilled in the art, the electric valves 4 and 5 are rendered alternately conductive and non-conductive by means of the phase shifting arrangement 29 and the associated excitation circuits 30.

During normal operation of the electric valve translating system, the magnetomotive forces established by the windings 15 and 16 of the device 10 will tend to produce a unidirectional flux substantially exclusively in a low reluctance magnetic circuit consisting of the leg members 12 and 13 and the core members 11 and 11'. It should be understood that the magnetomotive forces caused by windings 15 and 16 in the particular valve circuit arrangement illustrated will alternately act to establish this unidirectional flux. Under normal operating conditions there will be no appreciable flux in the magnetic circuit including the leg 14 by virtue of the relatively high reluctance of this magnetic path.

If it be assumed that the electric valve 4 arcs back or conducts current in the reverse direction during the period when electric valve 5 is normally conductive, the magnetomotive forces which windings 15 and 16 establish in the core member 11 will be in opposition, the winding 15 acting upon the magnetic circuit including leg 12 to cause flux to pass down through the leg 12 and the winding 16 tending to establish a flux passing down through the magnetic circuit including leg 13. The effect of this opposition of magnetomotive forces, acting coincidentally, will be to establish considerable flux in the magnetic path including leg 14, the flux in this circuit passing from the lower portion to the upper portion of the magnetic core member 11. The voltage induced in the winding 17 associated with the magnetic circuit including leg 14 under these conditions will cause a deflection of the movable contact or indicating member 20 of the voltage responsive device 18. The direction of the voltage induced in winding 17 is selectively responsive to the electric valve which is the first to conduct current in the reverse direction. The actuating element of the device 18 may be connected to the coil 17 in a manner to cause deflection of the movable contact member 20 to the left. In like manner, when electric valve 5 conducts reverse current or is subject to an arc-back during the period when electric valve 4 is normally conductive, a voltage of opposite polarity will be induced in the winding 17 to effect movement of the contact member 20 to the right. It will be understood that the relative positions of the contact member 20 to indicate failure of the electric valves 4 and 5 have been chosen arbitrarily. Upon being moved to either of these positions the movable contact or indicating member 20 may be made to energize the actuating element 7 of circuit interrupter 6 to control the energization of the electric valve translating system in response to abnormal operation of the electric valves 4 and 5. In applications where it is not necessary or desirable to control the energization of the circuit and where it is desirable to afford only an indication of the electric valve which has been subject to irregular operation, the switch 28 may be opened. After the above described operation, during which the movable member 20 has been actuated, the system may be reset by means of the button 25 associated with the plate 23 and retaining member 24 of voltage responsive element 18.

While I have shown and described my invention, as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent in the United States is:

1. In a device for indicating reversal of a predetermined electrical quantity of one of a plurality of electric circuits comprising a core member having a relatively low reluctance magnetic circuit and a relatively high reluctance magnetic circuit, a plurality of windings each being energized in response to said electrical quantity of one of said electric circuits and associated with said low reluctance magnetic circuit for impressing upon said magnetic circuit a magnetomotive force to establish a magnetic flux substantially exclusively in said low reluctance magnetic circuit, said core member being arranged to effect redistribution of said flux in said core member through said high reluctance magnetic circuit upon reversal of said electrical quantity of any one of said electric circuits, and means comprising a winding inductively associated with said high reluctance magnetic circuit for providing an indication upon reversal of said electrical quantity of one of said circuits.

2. In a current reversal indicating device, a magnetic core member having a relatively low reluctance magnetic circuit and a relatively high reluctance magnetic circuit, an energizing winding associated with said low reluctance magnetic circuit for impressing upon said magnetic circuit in a predetermined sequence magnetomotive forces to establish a flux substantially exclusively in said low reluctance circuit, said core member being arranged to effect redistribution of the flux in said core member through said high reluctance magnetic circuit upon reversal of the flux of one of said energizing windings, and means comprising a winding inductively associated with said high reluctance magnetic circuit for obtaining an electrical quantity for indicating reversal of the flux of said one of said first mentioned windings.

3. In a current reversal indicating device, a core member having a magnetic circuit of relatively low reluctance and a second magnetic circuit of relatively high reluctance, energizing windings associated with said low reluctance magnet circuit for impressing alternately upon said magnetic circuits magnetomotive forces to establish a flux substantially exclusively in said low reluctance circuit, said core member being arranged to effect establishment of magnetic flux in said high reluctance magnetic circuit upon reversal of the flux established by one of said windings, and means comprising a winding associated with said high reluctance magnetic circuit for obtaining a voltage in response to the change of flux in said high reluctance circuit for indicating reversal of current in one of said first mentioned windings.

4. In combination, a load circuit, a plurality of conductors for supplying unidirectional current to said load circuit, means comprising an inductive device including windings each energized in response to an electrical condition of an associated one of said conductors tending to establish unidirectional fluxes in the same direction in said inductive device when said electrical conditions are in a predetermined direction and tending to establish opposing unidirectional fluxes therein when one of said electrical conditions reverses direction, and means responsive to an electrical condition of said inductive device for controlling said supply conductors upon reversal of said electrical condition of one of said supply conductors.

5. In combination, a supply circuit, a load circuit, an inductive device for indicating the reversal of energy flow in said circuits comprising a core member having a magnetic circuit of relatively low reluctance arranged to be alternately subjected to unidirectional magnetomotive forces tending to establish unidirectional fluxes in the same direction in said core member when the energy transfer is in a predetermined direction, said core member having a magnetic section of relatively high reluctance energized in response to a reversal of magnetomotive force acting upon said low reluctance magnetic circuit upon reversal of energy transfer between said circuits.

6. In combination, a supply circuit, a load circuit, and a translating circuit comprising a plurality of electric valves each being arranged to conduct unidirectional current to said load circuit, and an inductive device comprising a core member having a relatively low reluctance magnetic circuit and a relatively high reluctance magnetic circuit, a plurality of windings being arranged to be energized in response to the current in a different one of said electric valves for establishing a component of flux substantially exclusively in said low reluctance circuit when said valves conduct current in the normal direction and for establishing a component of flux in said high reluctance circuit when any one of said valves conducts current in the reverse direction.

7. In combination, a load circuit, a plurality of conductors being arranged to supply said load circuit, a circuit interrupter for controlling the energization of said conductors, and an inductive device comprising a core structure having a magnetic circuit of relatively low reluctance and a magnetic circuit of relatively high reluctance, a plurality of windings connected respectively in series relation with different conductors and each arranged for producing a component of flux substantially exclusively in said low reluctance circuit when said conductors transmit current in a predetermined normal direction and for producing a component of flux in said high reluctance circuit when said conductors transmit current in the reverse direction, and a winding arranged to be linked by the component of flux in said high reluctance circuit for producing an electrical quantity in accordance with said last mentioned component of flux for controlling said circuit interrupter.

8. In combination, a supply circuit, a load circuit, a translating circuit for interconnecting said circuits comprising a pair of electric valves, and an inductive device comprising a core member having a relatively low reluctance magnetic circuit and a relatively high reluctance magnetic circuit, a pair of windings each being associated with a different one of said valves and each being energized in response to the current conducted by the associated one of said valves for producing alternately in said low reluctance circuit a component of flux when said valves conduct current in the normal direction and being arranged to produce a component of flux in said high reluctance circuit when either one of said valves conducts current in the reverse direction during the interval in which the other of said valves is conducting current in the normal direction.

9. In combination, a supply circuit, a load circuit, a translating circuit for interconnecting said circuits comprising a pair of electric valves connected to be rendered alternately conductive, and an inductance device comprising a core member having a relatively low reluctance magnetic circuit and a relatively high reluctance magnetic circuit, a pair of windings each being associated with a different one of said valves and each being energized in response to the current conducted by the associated one of said valves for producing alternately in said low reluctance circuit a unidirectional flux and for producing a component of flux in said high reluctance circuit when either of said valves conducts current in the reverse direction coincidentally with current conduction in the normal direction by the other of said valves.

10. In combination, a supply circuit, a load circuit, a pair of conductors interconnecting said circuits, a three-legged magnetic core having outside leg members forming a relatively low reluctance magnetic path and a leg member intermediate said outside members forming therewith a relatively high reluctance magnetic path, a pair of windings connected respectively in series relation with said pair of conductors and arranged on said outside leg members for producing substantially exclusively in said low reluctance path components of flux in the same direction when the direction of current flow in each of said conductors is the same and for producing a component of flux in said intermedaite leg member when the current flow in said conductors is opposite, and a winding on said intermediate leg member for providing an electrical quantity having a direction selectively responsive to reversal of current flow in either of said conductors.

11. In combination, a supply circuit, a load circuit, a pair of conductors interconnecting said circuits, a three-legged magnetic core having outside leg members forming a relatively low reluctance magnetic path and a leg member intermediate said outside members forming therewith a relatively high reluctance magnetic path, a pair of windings connected respectively in series relation with said pair of conductors and arranged on said outside leg members for producing substantially exclusively in said low reluctance path components of flux in the same direction when the direction of current flow in each of said conductors is the same and for producing a component of flux in one direction in said intermediate leg member when the current flow in one of said conductors is reversed and for producing a component of flux in the opposite direction in said intermediate leg member when the current flow in the other of said conductors is reversed, and a winding on said intermediate leg member for providing an electrical quantity having a direction responsive to the direction of magnetization of said intermediate leg member.

AUGUST SCHMIDT, Jr.